United States Patent
Philipp

(10) Patent No.: US 11,618,487 B2
(45) Date of Patent: Apr. 4, 2023

(54) METHOD OF OPERATING A RAIL-GUIDED PERMANENT WAY MACHINE, AND A PERMANENT WAY MACHINE

(71) Applicant: Plasser & Theurer Export von Bahnbaumaschinen GmbH, Vienna (AT)

(72) Inventor: Thomas Philipp, Leonding (AT)

(73) Assignee: Plasser & Theurer Export von Bahnbaumaschinen GmbH, Vienna (AT)

( * ) Notice: Subject to any disclaimer, the term of this patent is extended or adjusted under 35 U.S.C. 154(b) by 477 days.

(21) Appl. No.: 16/638,872

(22) PCT Filed: Sep. 4, 2018

(86) PCT No.: PCT/EP2018/073649
§ 371 (c)(1),
(2) Date: Feb. 13, 2020

(87) PCT Pub. No.: WO2019/068404
PCT Pub. Date: Apr. 11, 2019

(65) Prior Publication Data
US 2020/0361501 A1    Nov. 19, 2020

(30) Foreign Application Priority Data
Oct. 3, 2017    (AT) .................................. A 393/2017

(51) Int. Cl.
*B61K 9/08* (2006.01)
*B61L 23/04* (2006.01)
*E01B 35/06* (2006.01)

(52) U.S. Cl.
CPC .............. *B61K 9/08* (2013.01); *B61L 23/045* (2013.01); *B61L 23/047* (2013.01); *E01B 35/06* (2013.01)

(58) Field of Classification Search
CPC ........ B61K 9/08; B61L 23/045; B61L 23/047
See application file for complete search history.

(56) References Cited

U.S. PATENT DOCUMENTS

| 4,396,323 A | 8/1983 | Theurer |
| 6,860,453 B2* | 3/2005 | Moretti ............... B61L 15/0081 |
| | | 701/19 |
| 2014/0244080 A1* | 8/2014 | Herden .................... B61K 9/12 |
| | | 701/19 |

FOREIGN PATENT DOCUMENTS

| DE | 3015227 A1 | 3/1981 |
| DE | 202006019036 U1 | 3/2007 |

(Continued)

OTHER PUBLICATIONS

International Search Report of PCT/EP2018/073649, dated Nov. 30, 2018.

*Primary Examiner* — Manuel L Barbee
(74) *Attorney, Agent, or Firm* — Collard & Roe, P.C.

(57) ABSTRACT

A rail-guided permanent way machine is operated by means of a control device in such a way that at least one state variable (Z) of the permanent way machine is determined in dependence on an operating state, and the at least one state variable is compared to at least one pre-defined limit value ($G_W$, $G_S$) for monitoring a derailment safety of the permanent way machine. Thus, the derailment safety of the permanent way machine is determined in accordance with the current operating state and monitored. As a result, the permanent way machine has an expanded operating range and increased performance and thus increased efficiency.

14 Claims, 6 Drawing Sheets

(56) References Cited

FOREIGN PATENT DOCUMENTS

| EP | 1400427 A1 * | 3/2004 | ............ B60T 17/228 |
| WO | 2017144153 A2 | 8/2017 | |
| WO | WO-2017144153 A2 * | 8/2017 | ............. B61D 15/02 |

* cited by examiner

METHOD OF OPERATING A RAIL-GUIDED PERMANENT WAY MACHINE, AND A PERMANENT WAY MACHINE

FIELD OF TECHNOLOGY

The invention relates to a method of operating a rail-guided permanent way machine. Further, the invention relates to a permanent way machine having a first measuring sensor.

PRIOR ART

Rail-guided permanent way machines are used for the construction, renewal and maintenance of catenary installations. To that end, the permanent way machines have work devices such as, for example, elevating work platforms, freely swivelling work platforms, cranes and manipulators, which, dependent on a load and a position, generate a variable tilting moment on the particular permanent way machine. To ensure the derailment safety, the freedom of movement of the work devices as well as the working travel speed of the permanent way machine is restricted when assuming extreme conditions, for example a maximum load on the work devices and a maximal track super-elevation

SUMMARY OF THE INVENTION

It is the object of the invention to provide a method of operating a rail-guided permanent way machine which increases the performance and the efficiency of the permanent way machine and expands the operating range thereof.

This object is achieved by way of a method using a first measuring sensor. According to the invention, it was perceived that, by assuming extreme conditions, the performance of the permanent way machine is disproportionally limited in a multitude of work situations occurring in practice. For this reason, dependent on a momentary operating state, at least one state variable of the permanent way machine is determined, and the at least one state variable is compared to at least one pre-defined limit value. The at least one pre-defined limit value serves for monitoring the derailment safety of the permanent way machine so that, by the comparison of the at least one state variable to the at least one pre-defined limit value for the momentary operating state, it is examined whether the derailment safety is still reliably ensured or jeopardized. Thus it is possible to better exploit the performance and the potential operating range of the permanent way machine in dependence on the momentary operating state, so that the efficiency of the permanent way machine is improved. In spite of the expanded operating range and the increased performance of the permanent way machine, the derailment safety is reliably ensured at all times due to the monitoring.

The at least one state variable thus characterizes the derailment safety of the permanent way machine. The at least one state variable is preferably determined in dependence on a wheel guiding force and/or a vertical wheel force of the permanent way machine. The at least one state variable is preferably a ratio or a quotient of a wheel guiding force and a vertical wheel force. The determination of the at least one state variable and/or the comparison of the at least one state variable to the at least one limit value takes place preferably by means of a control device of the permanent way machine. The determining of the at least one state variable and the comparing to the at least one limit value takes place in particular in real time, so that the monitoring of the derailment safety during operation occurs quickly and reliably.

A method according to one embodiment ensures an expanded operating range and an increased performance and thus increased efficiency. Due to the fact that the at least one state variable is determined and compared to the at least one limit value repeatedly, in particular in equal intervals during a working run, the derailment safety is continuously monitored in a reliable manner during the working run and during the operation of the working device. The determining of the at least one state variable and the comparing to the at least one limit value take place preferably online and/or in real time. By the repeated determination and comparing, unrestricted operation of the working device during the working run is possible as long as the at least one state variable lies within a pre-defined tolerance range for the derailment stability.

A method according to another embodiment ensures an expanded operating range and an increased performance. If the at least one state variable lies beyond the tolerance range defined by the limit value $G_W$, the permanent way machine generates a warning signal, so that an operator of the permanent way machine receives a warning notice that the permanent way machine is in a border zone of the derailment safety. The warning signal is optical and or acoustical. Thus, the operator is able to change the current operating state of the permanent way machine in a manner so as to reduce a too high tilting moment causing the jeopardizing of the derailment safety. To that end, for example, the operator brings the working device into a safe state. The forward motion of the permanent way machine during a working run does not need to be interrupted for this purpose.

A method according to another embodiment ensures an expanded operating range and an increased performance. The operating state of the permanent way machine is automatically changed if the at least one state variable is beyond the tolerance range defined by the limit value $G_S$. Based on an acute threat to the derailment safety, the operating state of the permanent way machine is changed automatically in such a way that the permanent way machine is returned again to a safe operating state without any threat to the derailment safety. For example, the operating state is automatically changed in such a way that a drive of the permanent way machine is shut off and the permanent way machine is stopped and/or the tilting moment caused by the working device is reduced by a movement of the working device. Preferably, the permanent way machine generates a warning signal prior to an automatic change of the operating state, so that an operator has the possibility to himself return the permanent way machine to a safe operating state again.

A method according to another embodiment ensures an expanded operating range and an increased performance. The at least one state variable characterizing the derailment safety of the permanent way machine is dependent on a wheel guiding force required during the current operating state of the permanent way machine. The wheel guiding force, in turn, is dependent on a curvature parameter of the track or the track section on which the permanent way machine is presently located. In particular, the curvature parameter is a curve radius of the track section on which the permanent way machine is presently located. The curvature parameter is chosen in particular from the group: curve radius of the inside rail of the curve, curve radius of the outside rail of the curve, or mean curve radius of the track. The mean curve radius of the track lies between the curve radius of the inside rail of the curve and the curve radius of the outside rail of the curve. Due to the fact that the at least one state variable is determined in dependence on the curvature parameter of the track, the at least one state variable characterizes the derailment safety accurately and reliably, so that the monitoring of the derailment safety is reliably guaranteed.

A method according to another embodiment ensures an expanded operating range and an increased performance. Because the at least one state variable is determined in dependence on a wheel guiding force of the permanent way machine required for the derailment safety, a precise and reliable monitoring of the derailment safety is possible. The wheel guiding force is determined in dependence on the curvature parameter of the track or the track section on which the permanent way machine is presently located. The wheel guiding force is determined preferably on the basis of a chart and/or calculation rule deposited in a control device of the permanent way machine. The at least one state variable characterising the derailment safety of the permanent way machine is thus determined accurately and reliably.

A method according to another embodiment ensures an expanded operating range and an increased performance. By means of the at least one first measuring sensor, the at least one first measuring value is determined metrologically, from which is determined, in turn, the curvature parameter of the track or the track section on which the permanent way machine is presently located. The at least one state variable is determined in dependence on the curvature parameter. Since the derailment safety is dependent on a wheel guiding force of the permanent way machine, and the wheel guiding force, in turn, is dependent on the curvature parameter of the track, the at least one state variable characterizes the derailment safety accurately and reliably. Preferably, measurements regarding the at least one first measuring value are repeatedly determined metrologically by means of the at least one first measuring sensor, so that the curvature parameter is repeatedly determined from the measurements. This takes place preferably online and/or in real time.

A method according to another embodiment ensures an expanded operating range and an increased performance. If the permanent way machine has bogies, then it is possible in a simple and reliable manner by a measurement of the swing-out path of one of the bogies to determine the curvature parameter, in particular the curve radius, of the track section on which the permanent way machine is presently located. The swing-out path can be measured in a simple way by means of the at least one first measuring sensor. The measuring sensor is, in particular, a continuously or discretely designed path measuring sensor. The measuring sensor is, for example, a continuous linear sensor or a discrete mechanical shifting gate.

A method according to another embodiment ensures an expanded operating range and an increased performance. By measurement of the horizontal distance between the permanent way machine and the track, it is possible to determine accurately and reliably the curvature parameter of the track or track section on which the permanent way machine is presently located. The horizontal distance is also called a versine. The measuring of the horizontal distance is possible with permanent way machines having bogies as well as with permanent way machines without bogies, meaning with non-pivotable axles. The horizontal distance is measured in a central region of the permanent way machine, that is between the axles of the permanent way machine, and/or in the overhang of the permanent way machine. The at least one measuring sensor is designed in particular optically.

A method according to another embodiment ensures an expanded operating range and an increased performance. The derailment safety is dependent on a vertical wheel force of the permanent way machine. Due to the fact that the at least one state variable is determined in dependence on at least one vertical wheel force, the at least one state variable characterizes the derailment safety accurately and reliably. Thus, an accurate and reliable monitoring of the derailment safety is possible. The at least one vertical wheel force is determined by measurement and/or calculation. The at least one vertical wheel force is calculated, for example, from the determined curvature parameter.

A method according to another embodiment ensures an expanded operating range and an increased performance. The stored value for the at least one vertical wheel force characterizes an assumed minimally occurring vertical wheel force. As a result, the value of the at least one vertical wheel force which is the most unfavourable for the derailment safety enters into the determining of the at least one state variable. Thus, the calculation of the at least one state variable is simplified. Additionally, a stored value for the at least one vertical wheel force is preferably available in case that a measurement to be carried out for determining the at least one vertical wheel force can not be carried out, for example due to a technical defect.

A method according to another embodiment ensures an expanded operating range and an increased performance. By measurement of the at least one second measuring value, an accurate and reliable determination of the at least one vertical wheel force is possible. Since the at least one state variable is dependent on the at least one vertical wheel force, an accurate and reliable monitoring of the derailment safety is thus possible. Preferably, the at least one second measuring value is a force and/or a length. In case the permanent way machine has more than two axles, the at least one second measuring value is measured preferably on at least one outer axle. The outer axles are also called leading axle and following axle. Preferably, the at least one second measuring value is measured at both wheels of the respective axle, wherein—for determining the at least one state variable—especially the second measuring value of the load-relieved wheel is used, that is the wheel at the load-relieved side. The at least one second measuring value is preferably measured repeatedly, in particular at equal intervals. By means of the measuring values, the at least one state variable is determined online and/or in real time. Thus, the derailment safety is ensured continuously and reliably.

A method according to another embodiment ensures an expanded operating range and an increased performance. The at least one second measuring value is preferably a force and/or a length, in particular the spring deflection of a wheel of the permanent way machine. The spring deflection is measured, for example, by means of a continuous linear sensor. Preferably, at least one vertical wheel force is calculated from the at least one second measuring value. The at least one state variable is determined in dependence on-track undercarriage the at least one vertical wheel force. The at least one state variable is, for example, a ratio of a wheel guiding force to the corresponding vertical wheel force. Furthermore, the at least one state variable is determined, for example, in such a way that a temporal change of the second measuring value is determined, and the temporal change is compared to the at least one limit value. Thus, the derailment safety is ensured accurately and reliably.

A method according to another embodiment ensures an expanded operating range and an increased performance. The danger of a derailment can be recognised most quickly at an outer axle, that is at the leading axle and the following axle, and at the load-relieved side of the permanent way machine. Preferably, the at least one second measuring value is thus determined on at least one outer axle and on the load-relieved side of the permanent way machine. To that end, for example, second measuring sensors are arranged in each case at both wheels of at least one of the outer axles, determining the corresponding second measuring value. By way of the measuring values, it is recognized which side of the permanent way machine is load-relieved, so that the corresponding second measuring value is used for determining the at least one state variable.

It is a further object of the invention to provide a rail-guided permanent way machine which has an expanded operating range as well as an increased performance and efficiency.

This object is achieved by way of a permanent way machine having a permanent way machine device having first measuring sensor. The advantages of the permanent way machine according to the invention correspond to the advantages of the method according to the invention. In particular, the permanent way machine can be configured with the features of any one or more of the above embodiments.

BRIEF DESCRIPTION OF THE DRAWINGS

Additional features, advantages and details become apparent from the following description of several embodiments. There is shown in.

DESCRIPTION OF THE EMBODIMENTS

Figure 1:
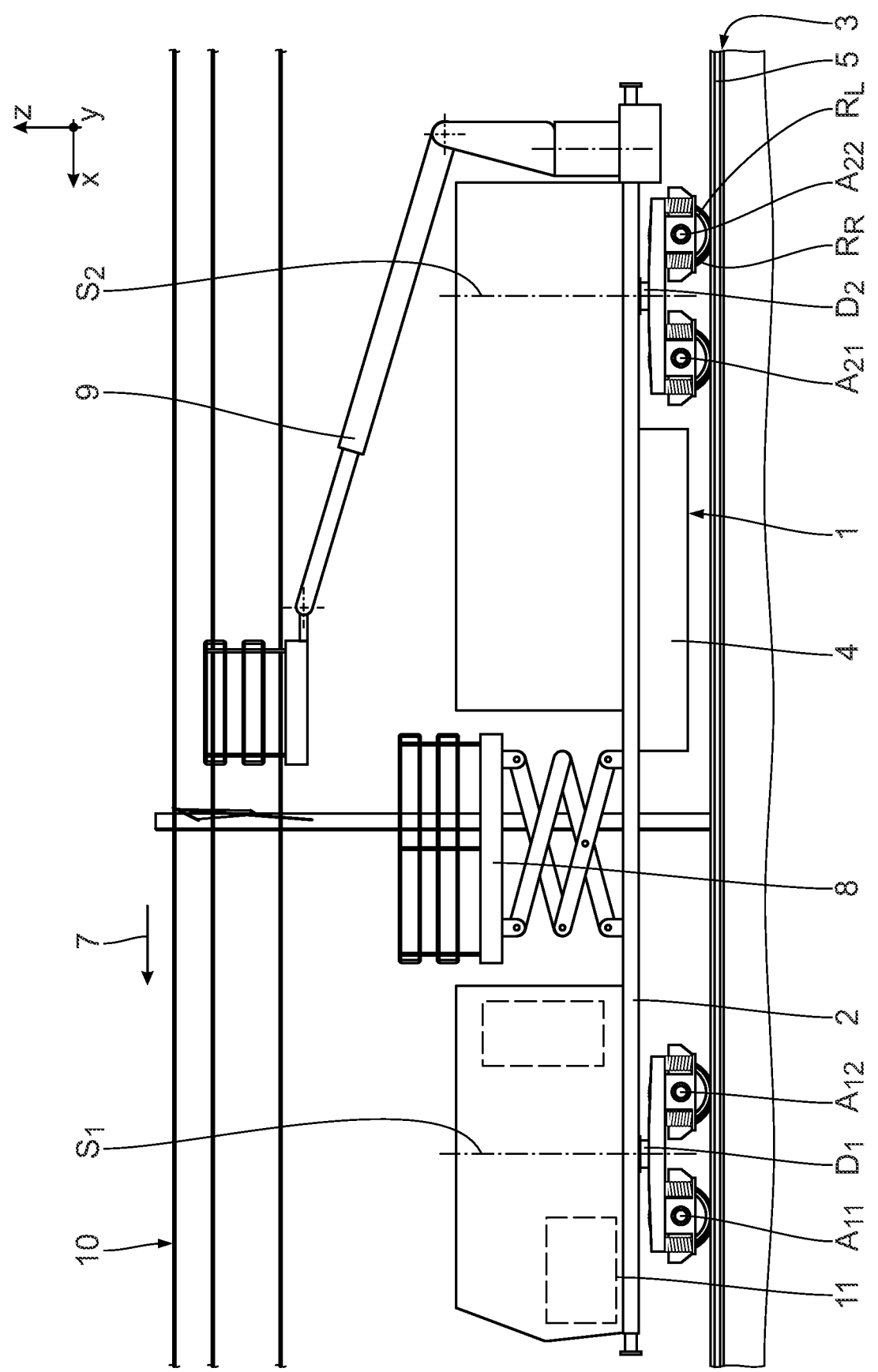
FIG. 1 a schematic depiction of a rail-guided permanent way machine according to a first embodiment, FIG. 2 a schematic top view of the permanent way machine of FIG. 1 situated on a track, FIG. 3 a geometric drawing for calculating a curve radius of the track in FIG. 2 on the basis of a swing-out path of a bogie of the permanent way machine, FIG. 4 a schematic representation of a bogie of the permanent way machine for visualization of a spring deflection measurement, FIG. 5 a schematic top view of a permanent way machine according to a second embodiment, and FIG. 6 a geometric drawing for determining a curve radius of the track on the basis of a measured distance between the permanent way machine and the track.
Figure 2:
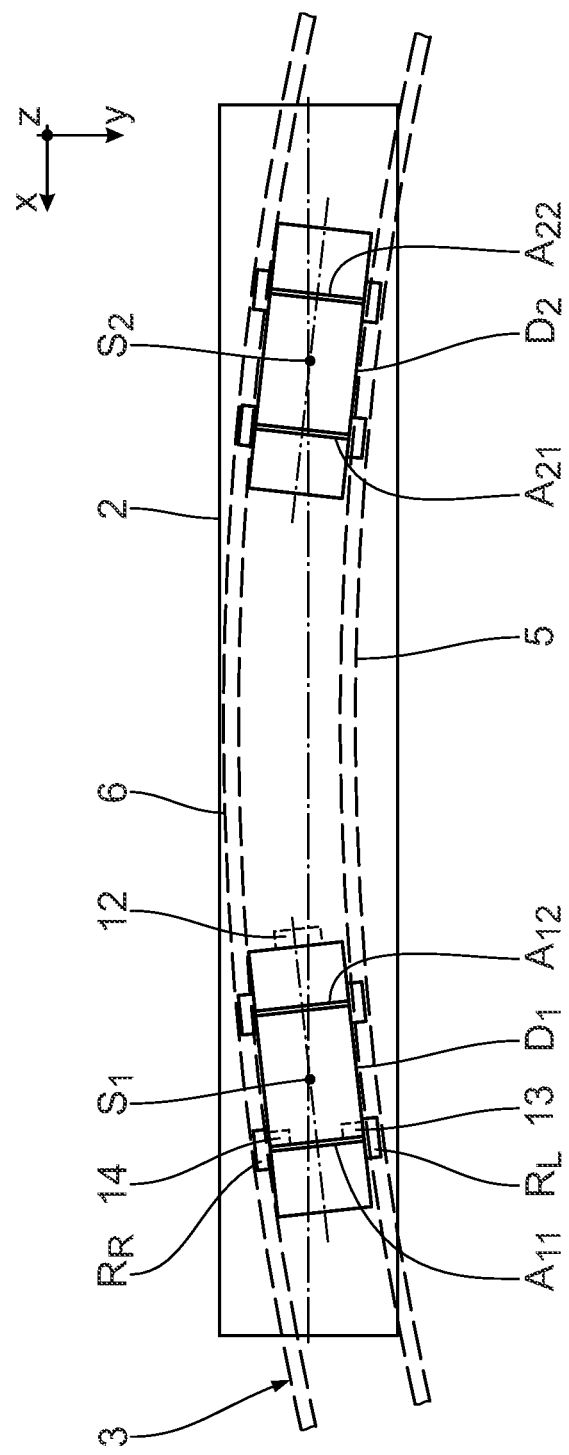

A first embodiment of the invention is described below with reference to FIGS. 1 to 4. A permanent way machine 1 has a machine frame 2 on which two bogies $D_1$ and $D_2$ are mounted for pivoting about associated pivot axes $S_1$ and $S_2$. Mounted on each of the bogies $D_1$, $D_2$ are two axles $A_{11}$, $A_{12}$ and $A_{21}$, $A_{22}$. The axles $A_{11}$ and $A_{22}$ form the outer axles of the permanent way machine 1. Two rail-guidable wheels $R_L$ and $R_R$ are fastened in each case to the axles $A_{11}$ to $A_{22}$. The bogies $D_1$, $D_2$ and the associated axles $A_{11}$ to $A_{22}$ are spaced from one another in a horizontal x-direction. The x-direction together with a horizontal y-direction and a vertical z-direction forms a machine-bound coordinate system. The pivot axes $S_1$ and $S_2$ extend parallel to the z-direction. The wheels $R_L$ and $R_R$ of the axles $A_{11}$ to $A_{22}$ are spaced from one another in the y-direction in correspondence to a gauge of the track 3. For rotary actuation of at least one of the axles $A_{11}$ to $A_{22}$, the permanent way machine 1 has a drive 4 mounted on the machine frame 2.

In operation, the permanent way machine 1 is arranged on rails 5, 6 of the track 3 and mobile in a rail-guided way in a working direction 7 by means of the drive 4. Working devices 8, 9 are fastened to the machine frame 2. The working device 8, for example, is designed as an elevating work platform and shiftable in the z-direction. The working device 9 is designed, for example, as a work platform freely pivotable in the x-, y- and z-direction. The working devices 8, 9 serve, for example, for construction, renewal and maintenance of a catenary installation 10 associated with the track 3.

For controlling the permanent way machine 1 and for monitoring a derailment safety, the permanent way machine 1 has a control device 11. The control device 11 is in signal connection to a first measuring sensor 12 and second measuring sensors 13, 14. The first measuring sensor 12 serves for measurement of a swing-out path $s_A$ of the bogie $D_1$. For measurement of the swing-out path $s_A$, the first measuring sensor 12 is arranged on the bogie $D_1$ and the machine frame 2. The first measuring sensor 12 is designed, for example, as a continuously measuring linear sensor or as a discretely measuring mechanical shifting gate. By the measurement of the swing-out path $s_A$, a first measuring value is supplied to the control device 11.

The axles $A_{11}$ to $A_{22}$ are mounted in the region of the respective wheels $R_L$ and $R_R$ on the respective bogie $D_1$, $D_2$ by means of springs 15. The measuring sensor 13 is arranged in the region of the wheel $R_L$ of the axle $A_{11}$, whereas the measuring sensor 14 is arranged in the region of the wheel $R_R$ of the axle $A_{11}$. The measuring sensor 13 serves for measuring a spring deflection $s_L$ between the wheel $R_L$ and the bogie $D_1$, whereas the measuring sensor 14 serves for measuring a spring deflection $s_R$ between the wheel $R_R$ and the bogie $D_1$. The measuring sensors 13, 14 are designed, for example, as continuously measuring linear sensors which are arranged in the region of the respective wheel $R_L$ and $R_R$ between the axle $A_{11}$ and the bogie $D_1$. The outer axle $A_{11}$ is the leading axle with regard to the working direction 7. Alternatively, or additionally, second measuring sensors can be arranged at the outer axle $A_{22}$ which is the following axle with regard to the working direction 7.

The operation of the rail-guided permanent way machine 1 and the monitoring of the derailment safety is described below:

For construction, renewal and/or maintenance of the catenary installation 10, the permanent way machine 1 is moved by an operator on the track 3 in the working direction 7 by means of the drive 4. The working devices 8, 9 are positioned as required for performing necessary tasks on the catenary installation 10. This operating state is called working run.

During the working run, the permanent way machine 1 determines repeatedly, preferably at constant time intervals, the swing-out path $s_A$ of the bogie $D_1$ by means of the first measuring sensor 12 and supplies the determined measuring values to the control device 11. In addition, the permanent way machine 1 determines repeatedly, preferably at constant time intervals, the spring deflections $s_L$ and $s_R$ in the region of the wheels $R_L$ and $R_R$ of the leading axle $A_{11}$ and supplies the determined measuring values to the control device 11. Preferably, the swing-out path $s_A$ and the spring deflections $s_L$ and $s_R$ are measured at coinciding times.

Depending on load and position, the working devices 8, 9 generate a tilting moment on the permanent way machine 1 which can jeopardize the derailment safety of the permanent way machine 1. For monitoring the derailment safety, a state variable Z of the permanent way machine 1 is determined in dependence on the current operating state, and the determined state variable Z is compared to pre-defined limit values $G_W$ and $G_S$ for monitoring the derailment safety. The state variable Z is a ratio of a wheel guiding force $Y_a$ and a vertical wheel force Q. Thus, the following applies for the state variable Z:

$$Z = Y_a/Q \quad (1).$$

The wheel guiding force $Y_a$ is determined in dependence on the measured swing-out path $s_A$. To that end, by means of the control device 11, a curvature parameter of the section of the track 3 on which the permanent way machine 1 is located currently or at the moment is at first determined from the measured swing-out path $s_A$. The curvature parameter is a curve radius R of the section of the track 3 on which the permanent way machine 1 is currently located. From the swing-out path $s_A$, a swing-out angle $\varphi$ is calculated first. The swing-out angle $\varphi$ ensues as follows:

$$\varphi \approx s_A/r \quad (2),$$

wherein $s_A$ is the measured swing-out path and r is a distance of the measuring sensor 12 from the pivot axis $S_1$ on the connecting line between the pivot axes $S_1$ and $S_2$. Usually, the swing-out path $s_A$ is significantly smaller than the distance r. The distance r is known and constant.

Figure 3:
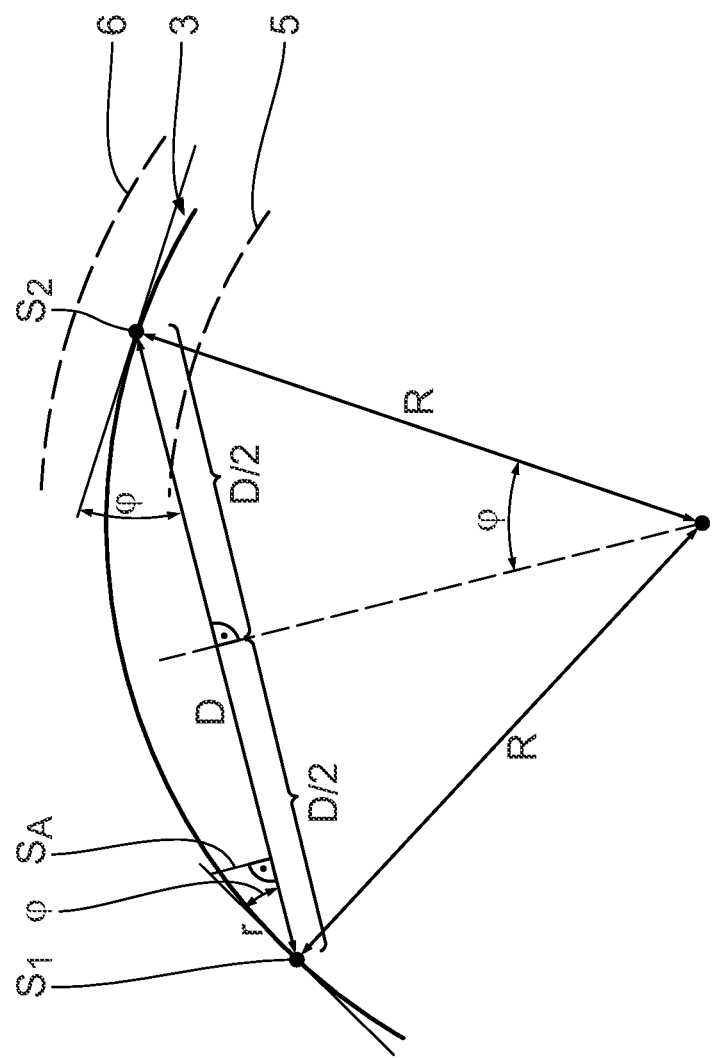
Figure 4:
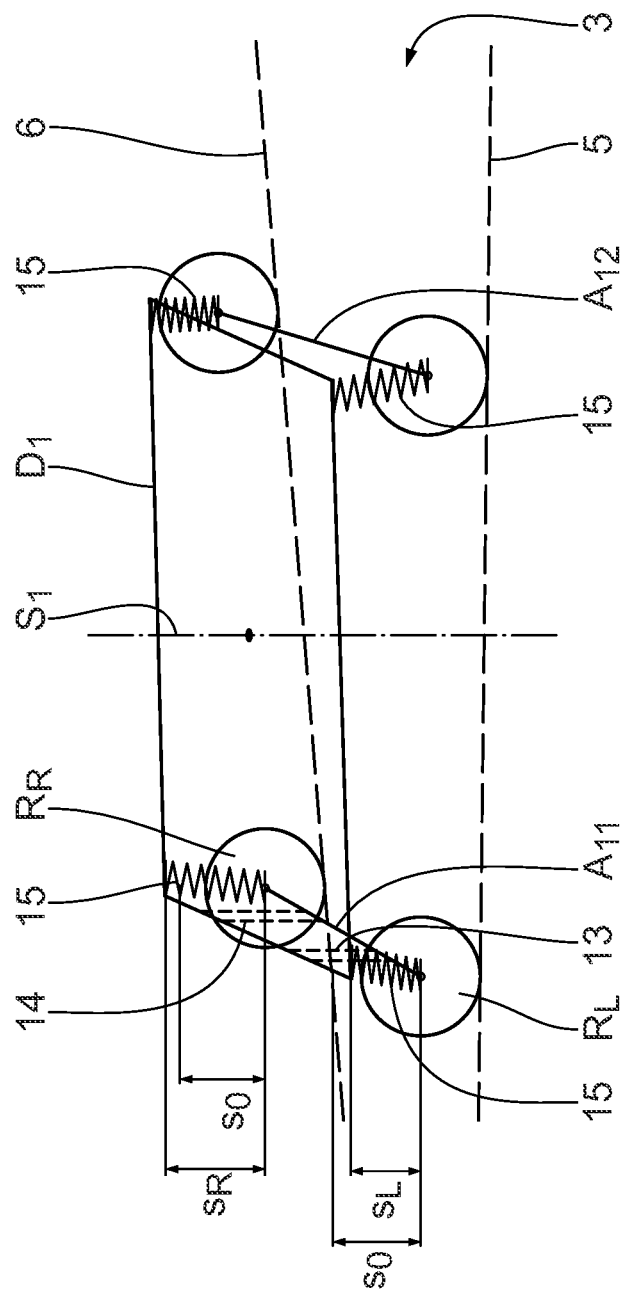

By way of the swing-out angle $\varphi$ according to formula (2), the curve radius R is computed as follows:

$$R = \frac{D}{2 \cdot \sin(\varphi)}, \quad (3)$$

wherein D is the distance of the pivot axes $S_1$ and $S_2$. The distance D is known and constant. The calculation of the curve radius R is shown in FIG. 3. Additionally, the curvature direction of the track 3 ensues from the swing-out path $s_A$, so that—in the example in FIG. 2—the wheel $R_L$ at the inside of the curve and the wheel $R_R$ at the outside of the curve can be determined unambiguously.

The curve radius R is a mean curve radius which lies between a curve radius of the outer rail 6 of the curve and the inner rail 5 of the curve. The curve radius R can be assumed approximately as the curve radius of the outer rail 6 of the curve or, for precise calculation of the curve radius of the outer rail 6 of the curve, can be increased by half the gauge of the track 3.

According to the norm or regulation ORE B55/RP8 (see Tab. I. 2, Lfd. Nr. 20), the wheel guiding force $Y_a$ of the outer wheel $R_R$ of the curve is determined in kN according to the following formula (4):

$$Y_a = \{\overline{Q}[x(m_1 \cdot a_q + m_2) + m_3 \cdot a_q + m_4] + x(c_1 \cdot a_q + c_2) + c_3 \cdot a_q + c_4\} 10^{-3},$$

wherein
$\overline{Q}$ is a mean vertical wheel force in kN,
$a_q$ is a lateral acceleration in m/s²,
$m_1$ to $m_4$ and $c_1$ to $c_4$ are regression factors, and
x is an auxiliary value.

For formula (4) and the calculation of the wheel guiding force $Y_a$ in kN, the following applies:

and
$a_q = 0$ m/s².

The mean vertical wheel force $\overline{Q}$ of the permanent way machine 1 is known and has been determined, for example, by a measurement. For the mean vertical wheel force $\overline{Q}$, the following applies, for example: $\overline{Q} = 65.12$ kN. For the variable auxiliary value x, the calculated curve radius R is entered in formula (4).

The vertical wheel force Q is dependent on a tilting moment acting upon the permanent way machine 1, a momentary twist in the track 3 and a super-elevation of the track 3. The current vertical wheel force Q results as follows:

$$Q = Q_0 - \Delta s \cdot k \quad (5),$$

wherein
$Q_0$ is a vertical wheel force in a resting position of the permanent way machine 1,
k is a spring constant of the springs 15, and
$\Delta s$ is a deflection path in or out.

The deflection path $\Delta s$ in or out ensues for $$\Delta s = s_L - s_0 \text{ for the wheel } R_L \quad (6),$$

$$\Delta s = s_R - s_0 \text{ for the wheel } R_R \quad (7),$$

wherein $s_L$, $s_R$ are the measured spring deflections and so is a spring deflection in the resting position.

From the calculated vertical wheel forces Q for the wheels $R_L$ and $R_R$, the smaller vertical wheel force Q of the outer wheel $R_R$ of the curve is selected since the outer wheel $R_R$ of the curve characterizes a load-relieved side of the permanent way machine 1. Subsequently, the state variable Z is computed according to formula (1) from the determined wheel guiding force $Y_a$ and the determined vertical wheel force Q of the wheel $R_R$.

The state variable Z characterizes the derailment safety of the permanent way machine 1. In order to examine whether the derailment safety is reliably ensured or jeopardized, the state variable Z is compared to the first limit value $G_W$ and the second limit value $G_S$. For the limit values, the following applies: $G_W < G_S$. The limit values are selected as follows, for example: $G_W = 0.98$ and $G_S = 1.08$.

During the working run, the control device 11 compares repeatedly and online or in real time the determined state variable Z to the first limit value $G_W$. If the limit value $G_W$ is exceeded, then the derailment safety is jeopardized and the permanent way machine 1 generates an acoustical and/or optical warning signal. On the basis of the warning signal, the operator has the possibility to transfer the permanent way machine 1 into a secure operating state again by reducing, for example, a too high tilting moment generated due to the position of the working devices 8, 9. Further, the control device 11 compares the determined state variable Z repeatedly to the second limit value $G_S$, for example, when the limit value $G_W$ has been exceeded. If the limit value $G_S$ is also exceeded, then the derailment safety of the permanent way machine 1 is acutely jeopardized, so that the control device 11 immediately and automatically changes the operating state of the permanent way machine 1. The control device 11 reduces, for example, the tilting moment by

| Regression factors | | | | | | | |
|---|---|---|---|---|---|---|---|
| $m_1$ | $m_2$ | $m_3$ | $m_4$ | $c_1$ | $c_2$ | $c_3$ | $c_4$ |
| 5.716 | −25.700 | −89.623 | 846.625 | −170.593 | 7.837 | 3609.753 | 1810.277 | automatically changing the position of the working devices 8, 9 and/or automatically stops the working run of the permanent way machine 1. As a result, the derailment safety of the permanent way machine 1 is ensured safely and reliably at all times. Simultaneously, the possible operating range and the performance of the permanent way machine 1 is exploited to the fullest within the scope of the derailment safety.

Figure 5:
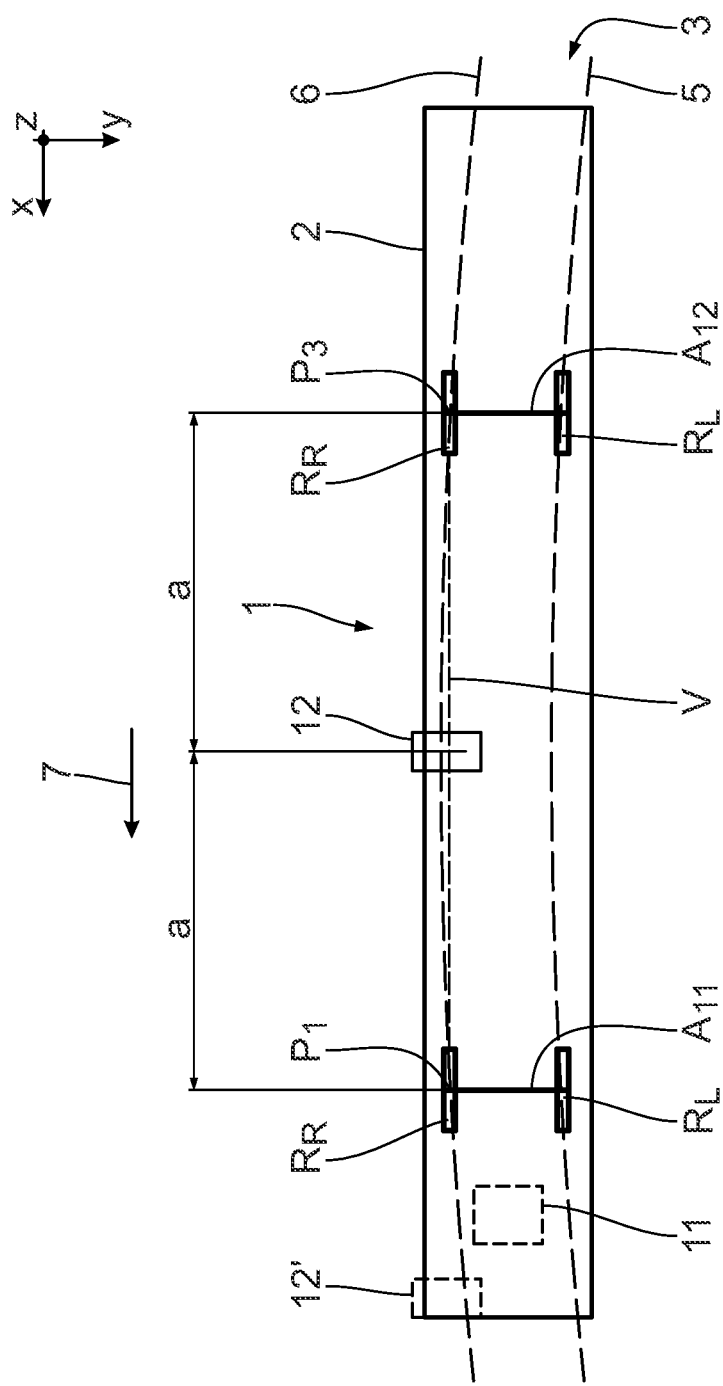
Figure 6:
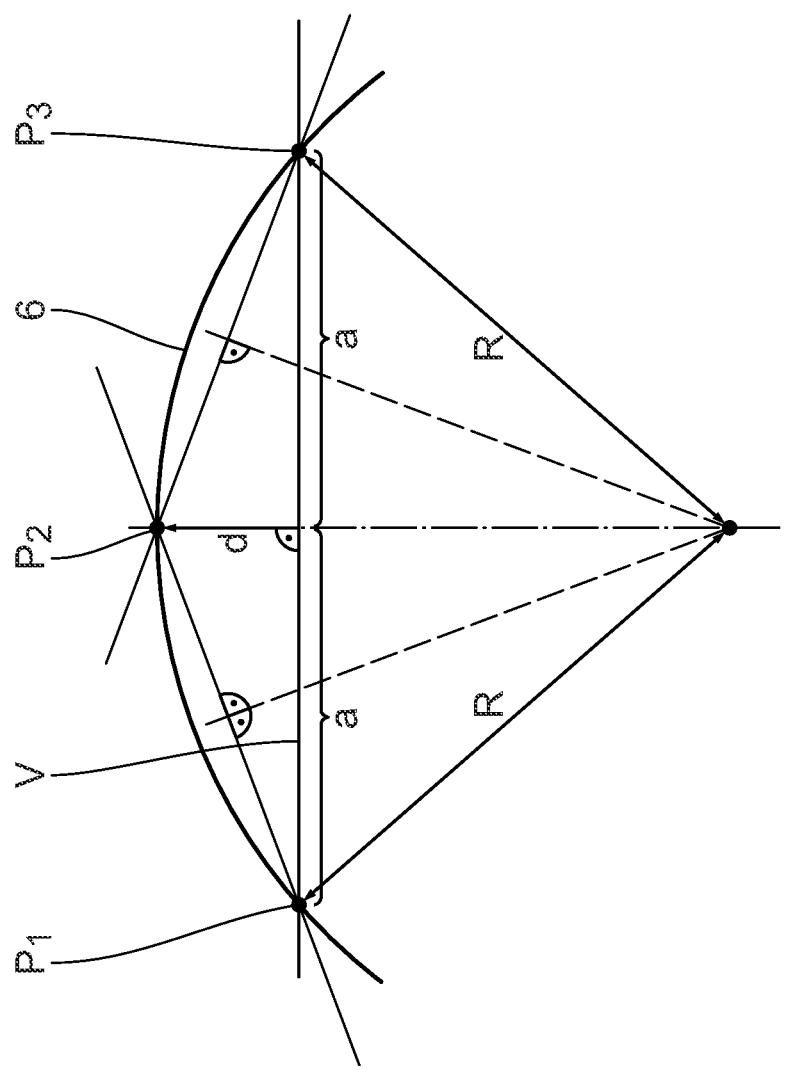

A second embodiment of the invention is described below with reference to FIGS. 5 and 6. Differing from the first embodiment, the permanent way machine 1 has two axles $A_{11}$ and $A_{12}$ which are not pivotable, that is not mounted by means of bogies on the machine frame 2. The first measuring sensor 12 is fastened to the machine frame 2 centrally between the axles $A_{11}$ and $A_{12}$ and serves for measuring a horizontal distance d between the permanent way machine 1 and one of the rails 5, 6 of the track 3. In FIG. 5, the measuring sensor 12 is arranged in the region of the outer rail 6 of the curve, so that it measures the horizontal distance d between the outer rail 6 of the curve and the permanent way machine 1. The measuring sensor 12 is designed optically, for example. The horizontal distance d is also called a versine.

Viewed geometrically, the measuring sensor 12 measures the distance d between the outer rail 6 of the curve and a connecting line V which is defined by the contact points $P_1$ and $P_3$ of the wheels $R_R$ of the axles $A_{11}$ and $A_{12}$. In FIG. 6, the measurement of the distance d and the calculation of the curve radius R of the outer rail 6 of the curve is depicted. By measurement of the distance d, a further point $P_2$ lying between the contact points $P_1$ and $P_3$ is determined. By the points $P_1$ to $P_3$, the curve radius R is defined unambiguously, so that the curve radius R can be calculated as follows:

$$R = \frac{a^2}{2 \cdot d} + -\frac{d}{2} \approx \frac{a^2}{2 \cdot d}, \tag{8}$$

wherein a is the distance of the contact points $P_1$ and $P_3$ from the measuring sensor 12. Since the distance d is significantly smaller than the distance a, the summand d/2 can be neglected.

Alternatively to the described arrangement of the measuring sensor 12 centrally between the axles $A_{11}$ and $A_{12}$, the arrangement can also be in an overhang of the permanent way machine 1. A corresponding first measuring sensor 12' is shown in FIG. 5. Accordingly, points $P_1$ to $P_3$ are thus defined from which the curve radius R can be calculated.

By way of the formula (1), the wheel guiding force $Y_a$ at the outer wheel $R_R$ of the curve can be calculated from the determined curve radius R according to the first embodiment. The calculation of the vertical wheel force Q and the state variable Z as well as the monitoring of the derailment safety by comparison to the limit values $G_W$ and $G_S$ take place according to the first embodiment. Regarding the further structure and the further function of the permanent way machine 1, reference is accordingly made to the first embodiment.

Alternatively or additionally, a minimal value $Q_{min}$ for the vertical wheel force Q can be stored in the control device 11, by means of which the calculation of the state variable Z and the monitoring of the derailment safety take place. In this case, the measurement of the spring deflections $s_L$ and $s_R$ and the associated second measuring sensors 13, 14 can be omitted. Thus, the structure of the permanent way machine 1 is simplified. Furthermore, the value $Q_{min}$ can be used for the case that the measurement of the spring deflection $s_L$ and/or the spring deflection $s_R$ is omitted. The value $Q_{min}$ occurring minimally in operation is calculated, for example, prior to putting the permanent way machine 1 into operation and stored as a fixed value in the control device 11.

Due to the fact that the derailment safety is constantly monitored in dependence on the current operating state of the permanent way machine 1, the performance of the permanent way machine 1 can be exploited up to the physical limits in any momentary operating state, so that the operating range of the permanent way machine 1 is expanded and the efficiency is increased.

The invention claimed is:

1. A method of operating a rail-guided permanent way machine, comprising the steps of:
providing a rail-guided permanent way machine on a track,
determining at least one state variable (Z) of the permanent way machine in dependence on an operating state, and
comparing the at least one state variable (Z) to at least one pre-defined limit value (Gw, Gs) for monitoring the derailment safety of the permanent way machine;
wherein the permanent way machine defines by means of at least one first measuring sensor at least one first measuring value from which a curvature parameter of the track is determined;
wherein the at least one first measuring value is a swing-out path $(S_A)$ of a bogie $(D_1)$ of the permanent way machine.

2. The method according to claim 1, wherein working device of the permanent way machine is operated during a working run, and the at least one state variable (Z) is repeatedly determined during the working run and compared to the at least one limit value $(G_W, G_S)$.

3. The method according to claim 1 wherein the at least one state variable (Z) is compared to at least one limit value $G_W$, and the permanent way machine generates a warning signal if the at least one state variable (Z) lies beyond a tolerance range defined by the limit value $G_W$.

4. The method according to claim 1, wherein the at least one state variable (Z) is compared to a limit value $G_S$, and the operating state of the permanent way machine is changed automatically if the at least one state variable (Z) lies beyond a tolerance range defined by the limit value $G_S$.

5. The method according to claim 1, wherein the at least one state variable (Z) is determined in dependence on a curvature parameter, in particular a curve radius (R) of the track.

6. The method according to claim 5, wherein, for determining the at least one state variable (Z), a wheel guiding force $(Y_a)$ of the permanent way machine necessary for the derailment safety is determined in dependence on the curvature parameter.

7. The method according to claim 1, wherein the at least one state variable (Z) is determined in dependence on at least one vertical wheel force (Q) of the permanent way machine.

8. The method according to claim 7, wherein, for the at least one vertical wheel force (Q), a pre-defined value (Qmin) is stored in a control device of the permanent way machine.

9. The method according to claim 7, wherein the permanent way machine determines by means of at least one second measuring sensor at least one second measuring value from which the at least one vertical wheel force (Q) is determined.

10. The method according to claim 9, wherein the at least one second measuring value is determined at least one outer axle ($A_{11}$) of the permanent way machine and/or at a load-relieved side of the permanent way machine.

11. The method according to claim 1, wherein the at least one state variable (Z) is determined in dependence on at least one second measuring value which is, in particular, a spring deflection ($s_L$, $s_R$) of a wheel ($R_L$, $R_R$) of the permanent way machine.

12. A method of operating a rail-guided permanent way machine, comprising the steps of:
   providing a rail-guided permanent way machine on a track,
   determining at least one state variable (Z) of the permanent way machine in dependence on an operating state, and
   comparing the at least one state variable (Z) to at least one pre-defined limit value (Gw GO for monitoring the derailment safety of the permanent way machine;
   wherein the permanent way machine defines by means of at least one first measuring sensor at least one first measuring value from which a curvature parameter of the track is determined;
   wherein the at least one first measuring value is a horizontal distance (d) between the permanent way machine and the track.

13. A permanent way machine having
   a machine frame,
   at least two axles ($A_{11}$, $A_{12}$, $A_{21}$, $A_{22}$; $A_{11}$, $A_{22}$) mounted on the machine frame and rail-guidable wheels ($R_L$, $R_R$) arranged thereon,
   a drive for rotary actuation of at least one of the axles ($A_{11}$, $A_{12}$, $A_{21}$, $A_{22}$; $A_{11}$, $A_{22}$), and
   a working device fastened to the machine frame, comprising a control device which is designed in such a way that
   at least one state variable (Z) of the permanent way machine is determined in dependence on an operating state, and
   the at least one state variable (Z) is compared to at least one pre-defined limit value ($G_W$, $G_S$) for Monitoring a Derailment Safety of the Permanent Way Machine;
   at least one first measuring sensor configured to determine at least one first measuring value from which a curvature parameter of the track is determined;
   wherein the first measuring sensor is configured to determine at least one first measuring value which is a swing-out path (sA) of a bogie (D1) of the permanent way machine.

14. A permanent way machine having
   a machine frame,
   at least two axles ($A_{11}$, $A_{12}$, $A_{21}$, $A_{22}$, $A_{11}$, $A_{22}$) mounted on the machine frame and rail-guidable wheels ($R_L$, $R_R$) arranged thereon,
   a drive for rotary actuation of at least one of the axles ($A_{11}$, $A_{12}$, $A_{21}$, $A_{22}$, $A_{11}$, $A_{22}$), and
   a working device fastened to the machine frame, comprising a control device which is designed in such a way that
   at least one state variable (Z) of the permanent way machine is determined in dependence on an operating state, and
   the at least one state variable (Z) is compared to at least one pre-defined limit value ($G_W$, $G_S$) for monitoring a derailment safety of the permanent way machine;
   at least one first measuring sensor configured to determine at least one first measuring value from which a curvature parameter of the track is determined;
   wherein the sensor is configured to determine a first measuring value that is a horizontal distance (d) between the permanent way machine and the track.

* * * * *